United States Patent
Furman et al.

(10) Patent No.: US 7,903,756 B2
(45) Date of Patent: Mar. 8, 2011

(54) SYSTEM AND METHOD FOR COMMUNICATING DATA USING WAVEFORM WITH EXTENDED PREAMBLE

(75) Inventors: William N. Furman, Fairport, NY (US); John W. Nieto, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 757 days.

(21) Appl. No.: 11/876,053

(22) Filed: Oct. 22, 2007

(65) Prior Publication Data

US 2009/0102687 A1   Apr. 23, 2009

(51) Int. Cl.
*H04L 27/00* (2006.01)
(52) U.S. Cl. .......................................... 375/295; 375/260
(58) Field of Classification Search .................. 375/260, 375/219, 222; 341/106; 455/450
See application file for complete search history.

(56) References Cited

U.S. PATENT DOCUMENTS

| | | | |
|---|---|---|---|
| 4,309,764 A | 1/1982 | Acampora | 370/83 |
| 5,682,602 A | 10/1997 | Walker et al. | 455/33.2 |
| 5,905,762 A | 5/1999 | Stephens | 375/326 |
| 5,930,685 A | 7/1999 | Straub | 455/72 |
| 6,331,976 B1 | 12/2001 | Sriram | 370/350 |
| 6,839,876 B1 | 1/2005 | Tong et al. | 714/783 |
| 6,934,327 B1 | 8/2005 | Whited et al. | 375/225 |
| 7,092,402 B1 | 8/2006 | Smith et al. | 370/437 |
| 2003/0212827 A1 | 11/2003 | Saha et al. | 709/247 |
| 2004/0228269 A1 | 11/2004 | Balakrishnan et al. | 370/208 |
| 2005/0174284 A1 | 8/2005 | Abraham et al. | 342/357.09 |
| 2005/0181800 A1 | 8/2005 | Trachewsky et al. | 455/452.1 |
| 2007/0153725 A1 | 7/2007 | Waxman | 370/349 |
| 2008/0045228 A1* | 2/2008 | Zhang et al. | 455/450 |

FOREIGN PATENT DOCUMENTS

| | | |
|---|---|---|
| EP | 0991218 | 4/2000 |
| EP | 1587267 | 10/2005 |
| WO | 200213441 | 2/2002 |
| WO | 2007091924 | 8/2007 |

OTHER PUBLICATIONS

Anonymous, "Telecommunications and information exchange between systems-Local and metropolitan area networks-Specific requirements—Part II: Wireless LAN Medium Access Control (MAC) and Physical Layer (PHY) Specifications", IEEE Computer Society, Jun. 2007.

* cited by examiner

*Primary Examiner* — Emmanuel Bayard
(74) *Attorney, Agent, or Firm* — Allen, Dyer, Doppelt, Milbrath & Gilchrist, P.A.

(57) ABSTRACT

A system communicates data and includes an encoder for encoding communications data. A modulator maps the communications data based on a specific mapping algorithm to form a communications signal over which the communications data can be transmitted. The communications signal includes a preamble that has set-up or transmission parameters used for acquiring the signal at a modem and at least one extended preamble for conveying additional set-up or transmission parameters. This extended preamble includes N extended preamble bits having at least one of information, transmission parameter and control bits and M map bits that identify a predetermined mapping for the N extended preamble bits.

25 Claims, 7 Drawing Sheets

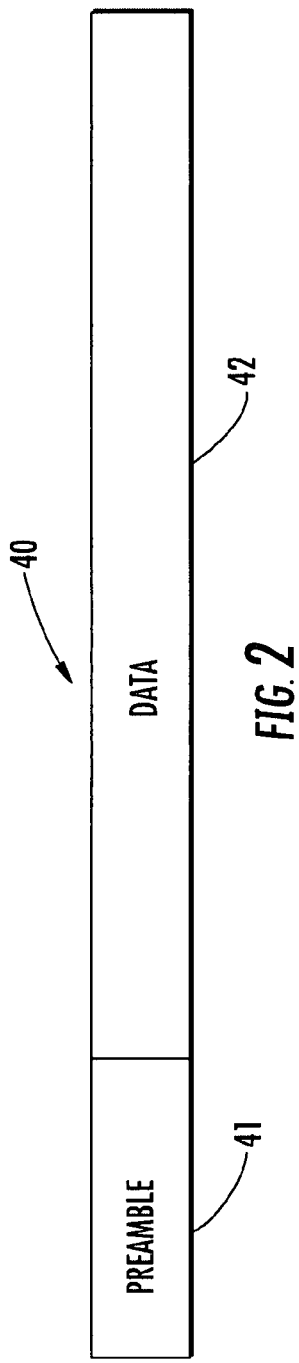

SYSTEM AND METHOD FOR COMMUNICATING DATA USING WAVEFORM WITH EXTENDED PREAMBLE

FIELD OF THE INVENTION

The present invention relates to communications systems and, more particularly, the present invention relates to communications systems that use waveforms with preambles for acquiring a signal at a modem.

BACKGROUND OF THE INVENTION

Some multi-band or other tactical radios operate in the high frequency (HF), very high frequency (VHF) (for satellite communications), and ultra high frequency (UHF) bands. The frequency range of these multi-band tactical radios is from about 2 MHz to about 512 MHz. Next generation radios will probably cover about 2.0 to about 2,000 MHz (or higher) to accommodate wider bandwidths, higher data rate and less crowded frequency bands. Several standards have been developed for the different frequency bands. For HF, US MIL-STD-188-110B and US MIL-STD-188-141B specify waveform and minimum performance requirements of waveforms and radio equipment, the disclosures which are incorporated by reference in their entirety.

UHF standards, on the other hand, provide different challenges over the 225 to about 512 MHz frequency range, including short-haul line-of-sight (LOS) communication and satellite communications (SATCOM) and cable. This type of propagation can be obtained through different weather conditions, foliage and other obstacles making UHF SATCOM an indispensable communications medium for many agencies. Different directional antennas can be used to improve antenna gain and improve data rates on the transmit and receive links. This type of communication is typically governed in one example by MIL-STD-188-181B, the disclosure which is incorporated by reference in its entirety. This standard specifies a family of constant and non-constant amplitude waveforms for use over satellite links.

The joint tactical radio system (JTRS) implements some of these standards and has different designs that use oscillators, mixers, switchers, splitters, combiners and power amplifier devices to cover different frequency ranges. The modulation schemes used for these types of systems can occupy a fixed bandwidth channel at a fixed carrier frequency or can be frequency-hopped. These systems usually utilize memoryless modulations, such as a phase shift keying (PSK), amplitude shift keying (ASK), frequency shift keying (FSK), quadrature amplitude modulation (QAM), or modulations with memory such as continuous phase modulation (CPM) and combine them with a convolutional or other type of forward error correction code. Standard waveforms are often used.

Some defined standard waveforms use a fixed preamble for modem time and frequency synchronization before the transmission of data. Some defined standards, such as MIL-STD-188-110B and STANAG 4539, use a fixed and data bearing preamble, where data is encoded at a robust low bit rate to convey transmission parameters such as a data rate and/or interleaver setting. These preambles are not extensible or flexible. Additional data fields identifying additional or alternate transmission parameters or modes of operation cannot easily be added to these existing waveforms.

Typically, a modem operating in accordance with the MIL-STD-188-110B standard will acquire a signal while looking for a pattern. The modem will look at the different parameters in the preamble to determine what waveform it is receiving. This preamble usually has known symbols to obtain a reliable acquisition. Typically, there is a portion of the preamble having predetermined numbers that the modem uses to determine what waveform modulation follows and what interleaver setting is being used.

The preambles are not extensible because the preambles in these standard waveforms have a predetermined number of bits. Often two slots or values are left free with identifiers. It would be advantageous if additional information could be presented in the preamble to convey additional set-up or transmission parameters to more fully automate a radio system.

SUMMARY OF THE INVENTION

A system communicates data and includes an encoder for encoding communications data. A modulator maps the communications data based on a specific mapping algorithm to form a communications signal over which the communications data can be transmitted. The communications signal includes a preamble that has set-up or transmission parameters used for acquiring the signal at a modem and at least one extended preamble for conveying additional set-up or transmission parameters. This extended preamble includes N extended preamble bits having at least one of information, transmission parameter and control bits and M map bits that identify a predetermined mapping for the N extended preamble bits.

The preamble includes a modulation parameter field having identifiers for data rate and interleaver settings. The at least one extended preamble can be identified by unused identifiers in this modulation parameter field. P parity bits can be added for error correction to check the validity of the extended preamble. The control bits can indicate the number of extended preambles. The control bits can sequentially count down to identify the number of extended preambles and sequentially count down to "0" for identifying the last extended preamble. A block FEC (Forward Error Correction) code can be added to the extended preamble.

The N extended preamble bits can be formed as information identifying where specific data is located within the signal corresponding to a selected type of data. Additional set-up or transmission parameters can be formed as information regarding at least one of a digital voice (DV) mode as a vocoder/bit rate, transmission length, addressing bits, reverse path quality metrics, and information regarding how the data transmission is sectioned.

A method and communications data packet is set forth.

BRIEF DESCRIPTION OF THE DRAWINGS

Other objects, features and advantages of the present invention will become apparent from the detailed description of the invention which follows, when considered in light of the accompanying drawings in which:

FIG. 2 is a fragmentary block diagram of a standard communications data packet used, for example, with the MIL-STD-188-110B standard and showing a preamble and data portion.

FIG. 3 is a table showing a comparison among values used for the data rate, short interleaver and long interleaver in the MIL-STD-188-110B standard and showing unused values for the interleaver that can be used for the extended preamble in accordance with a non-limiting example of the present invention.

DETAILED DESCRIPTION OF THE PREFERRED EMBODIMENTS

Figure 1:
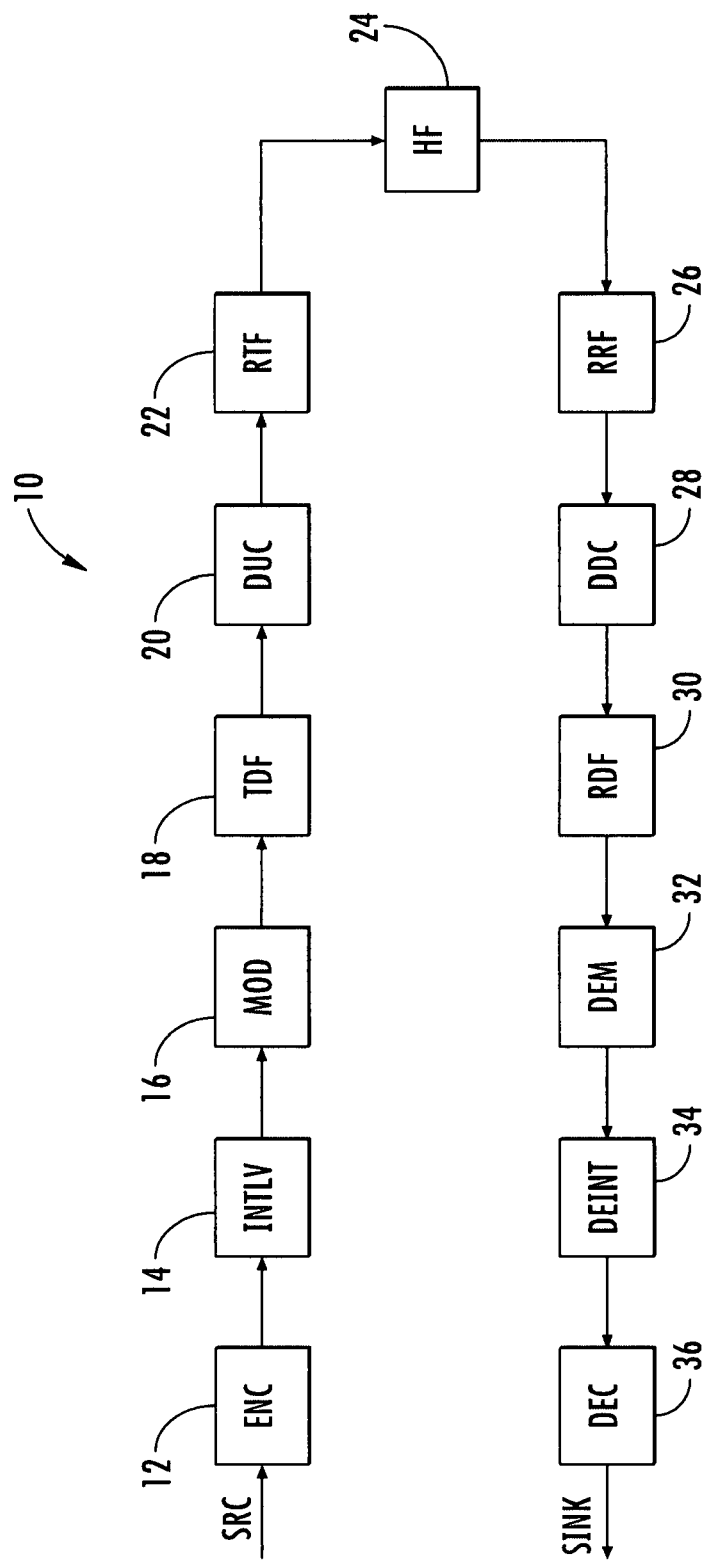
FIG. 1 is a block diagram of an example of a typical prior art high frequency communication system showing different modulators and demodulators, filters, interleavers and deinterleavers, and forward error correction (FEC) encoders and decoders.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout, and prime notation is used to indicate similar elements in alternative embodiments.

It should be appreciated by one skilled in the art that the approach to be described is not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As will be appreciated by those skilled in the art, a method, data processing system, or computer program product can embody different examples in accordance with a non-limiting example of the present invention. Accordingly, these portions may take the form of an entirely hardware embodiment, an entirely software embodiment, or an embodiment combining software and hardware aspects. Furthermore, portions may be a computer program product on a computer-usable storage medium having computer readable program code on the medium. Any suitable computer readable medium may be utilized including, but not limited to, static and dynamic storage devices, hard disks, optical storage devices, and magnetic storage devices.

The description as presented below can apply with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

For purposes of description, a typical high frequency communications system used for transmitting and receiving digital data is described with reference to FIG. 1. This system can communicate using different standards and waveforms, including waveforms pertaining to the MIL-STD-188-110B standard. The system and method can employ this technology and adopt it and apply an extended preamble in accordance with a non-limiting example of the present invention.

As shown in FIG. 1 for this typical HF communications system 10 at a transmit section, a data stream (Src) that is to be transmitted is forwarded as 1's and 0's as is typical. The encoder 12 is operative as a Forward Error Correction (FEC) encoder and applies a FEC algorithm to the data, which passes to an interleaver 14, which interleaves the data, which is then modulated by a modulator 16. In some prior art systems having similar functions, differential modulation is applied at this point. The present invention can use coherent modulation in the modulator 16, for example. The modulator 16 could be a two, four or eight PSK modulator as a non-limiting example. Mini probe sequences can also be applied. The data is passed into a transmit digital low-pass filter 18, and the data is up-converted by a digital up-conversion circuit 20 from baseband to an 1800 Hz carrier in this one non-limiting example. A radio transmit filter (RTF) 22 limits the bandwidth of the transmit waveform to about 3 KHz. The data is passed to a high frequency, multi-path and fading channel simulator circuit (meant to simulate an HF channel) 24, where multi-path is modeled as a tapped-delay line, and each tap in the tapped-delay line has fading characteristics based on the Watterson model.

At a receiver section, a radio receive filter 26 limits the bandwidth of the data signal to about 3 KHz. The data is digitally down-converted in the converter 28 from 1800 Hz carrier to baseband in this non-limiting example. The data passes into a receive digital low-pass filter 30 that is ideally the same as the transmit digital low-pass filter (TDF) 18. The demodulation occurs followed by deinterleaving within a deinterleaver circuit 34. The forward error correction (FEC) decoder circuit 36 decodes the data and passes it as a received bit stream (Sink).

FIG. 2 is a fragmentary block diagram of a communications data packet 40 that is typically used in various communication systems, including those communication systems that operate in accordance with the MIL-STD-188-110B and the STANAG 4539 standard. As illustrated, this communications data packet 40 includes a preamble 41 and data portion 42. This preamble was not flexible and extendible as described before.

For purposes of explanation, a description of the MIL-STD-188-110B standard is now set forth. MIL-STD-188-110B Appendix C defines a family of high data rate waveforms that can provide data rates from 3200 BPS up to 12,800 BPS. In a non-limiting example, the waveforms have different transmission phases and can use a transmit level control (TLC) block that carries no information and is generated solely for the purpose of radio TGC (transmit gain control), ALC (automatic level control), and AGC (automatic gain control) settling before an actual preamble is sent and received. This TLC block has a variable length from 0-7 with each count having a length of about 184 symbols. An initial preamble can be about 287 symbols and is used for reliable synchronization and autobauding at the start of transmission. It could contain as a non-limiting example 184 symbols used exclusively for synchronization with the remaining 103 symbols used for determining the data rate and interleaver setting, i.e., autobaud. About 72 blocks in this non-limiting example could be alternating unknown/known symbols, for example, where each block has 256 data symbols followed by 31 known symbols. A 72 symbol subset of the initial preamble can be used for late acquisition, autobaud, Doppler shift removal and synchronization adjustment.

The main body of US MIL-STD-188-110B defines a family of waveforms providing data rates between 75 bps up to 4800 bps. It uses a 600 ms or 4.8 second preamble with an embedded 4 bit count and 4 bit modulation parameter field. The count transitions identify the end of the preamble. A modulation parameter field identifies the transmitted bit rate and interleaver setting and contains several unused identifiers as shown in the table of FIG. 3, showing the bit rate, a short interleaver setting for D1 and D2 and a long interleaver setting for D1 and D2. As illustrated, 5-7 can be used to identify the extended preamble because of the unused block section.

This table shows the two-bit areas as D1 and D2 and shows the mapping of these to identify an on-air data rate and interleaver being used. The pair D1 and D2 has a respective value of 5,7 as one no-limiting example. It can be used for an extended preamble. This corresponds to the data and the two symbols as slots. As a non-limiting example, when the value 5,7 appears in D1 and D2, this becomes the identifier to latch onto the new preamble. It is also possible to use any of the numerals for 6 or 7 such as 5,6 and 5,7 as a non-limiting example. Thus, in this case using the MIL-STD-188-110B, there are two identifiers "open," indicating that there is more in the preamble, thus, corresponding to an extended preamble in accordance with a non-limiting example of the present invention.

The mechanism as described adds a number of extended preamble (EP) frames to convey additional set-up or transmission parameters, for example, a digital voice (DV) mode as used in a vocoder/bit rate system. It is also possible to convey in this extended preamble a different set-up for the transmission parameters, including the transmission length, addressing bits, reverse path quality metrics and similar data. The extended preamble can also be used to section the data transmission into a number of distinct entities for more efficient transmission of multiple data sources. For example, the extended preamble could specify that the data transmission contains N bytes of digital voice (DV) followed by M bytes of automatic repeat request (ARQ) data followed by P bytes of broadcast data. Each of these concatenated data sections could be at different data rates and modulation schemes. These additional fields could also be used to more fully automate the radio system.

It should be understood that when using some systems such as digital voice and data, long preambles were necessary to obtain reliable acquisition in difficult HF channel conditions. In a prior art problem, the system may desire to transmit large portions of digital voice and data and in the prior art systems, one separate transmission of preamble for digital voice would have to be transmitted and then another preamble transmitted for the digital data. This adds to the overhead by having to send this large preamble many times.

The extended preamble, in accordance with a non-limiting example of the present invention, on the other hand, gives the system the ability to combine a number of transmissions into a single transmission having only one preamble with the right information in the extended preamble to demodulate different pieces of data embedded in the transmission.

Figure 4:
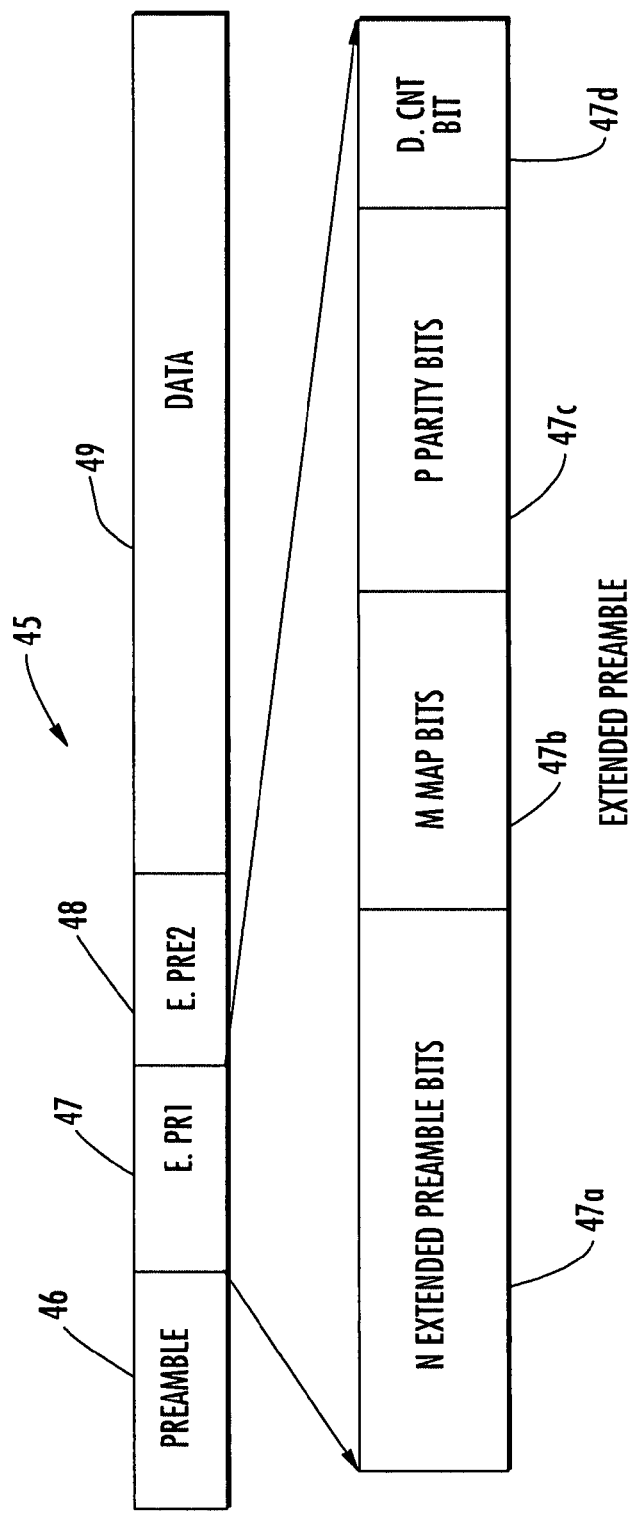
FIG. 4 is a fragmentary block diagram showing a communications data packet with two extended preambles used, for example, with the MIL-STD-188-110B standard and showing one of the extended preambles that is enlarged to show the different sections.

FIG. 4 shows a communications data packet 45 with a preamble 46 and two extended preambles 47, 48 followed by the data portion 49. The first extended preamble 47 is expanded to show N extended preamble bits 47a, M map bits 47b, P parity bits 47c and D control bits 47d. The preamble 45 is extended to convey more information, parameter or control bits and as shown in FIG. 4, convey two extended preambles as two additional blocks are added. The bit fields are illustrated and N extended preamble bits 47a contain information, parameter and/or control bits. The M map bits 47b can identify the specific fields in the extended preamble bits 47a as a specific mapping. P parity bits 47c are added for error detection and D control bits 47d count down to 0 the identifying last extended preamble block. N, M, P and D bits are system parameters fixed for a particular system. The number of extended preambles and the mapping of the bits can vary within an application. It is also possible to add a block FEC code to the bits for forward error correction (FEC).

For example, in the illustration of FIG. 4, an extended preamble 45 could be for digital voice and then an extended preamble for the ARQ (i.e. reliable transmission of digital data). It is possible to use multiple extended preamble blocks, one for each of the items that should be transmitted, such as digital voice, video and broadcast, each having an extended preamble. The N extended preamble bits 47a have the information identifying where it is located, while the M map bits 47b define a predetermined mapping, for example, by using three bits to say what mode there is. For example, in one non-limiting simple example, the N extended preamble bits 47a could identify digital voice and 1,000 bytes. The M map bits 47b could indicate a code, such as 001, to indicate that the N extended preamble bits 47a were broken up, for example, 3 bits for the mode and 10 bits for the number of bytes. The M map bits 47b can indicate how to interpret the N extended preamble bits 47a. These bits could be interpreted differently depending on what the M map bits 47b are.

In prior art systems using the MIL-STD-188-110B standard, typically there was no cyclic redundancy check (CRC) on the preamble. If a mistake was made in transmission, the modem could acquire but would make a wrong decision, and thus, would have to deacquire, wasting resources and time. The control bits 47d can determine how many blocks are following. This could be a field of multiple bits that could be covered by the parity bits as well. For example, there could be a number of extended preamble bits 47a and the D control bits 47d could count down. If the control bit was 0, then that would be the last extended preamble. For example, there may be a different extended preamble, and three bits could be used for counting down one extended preamble to the next. Preamble 1 could be followed by preamble 2 and the values could be 001 followed by 000, highlighting that the extended preamble corresponding to 000 is the last extended preamble.

Figure 5:
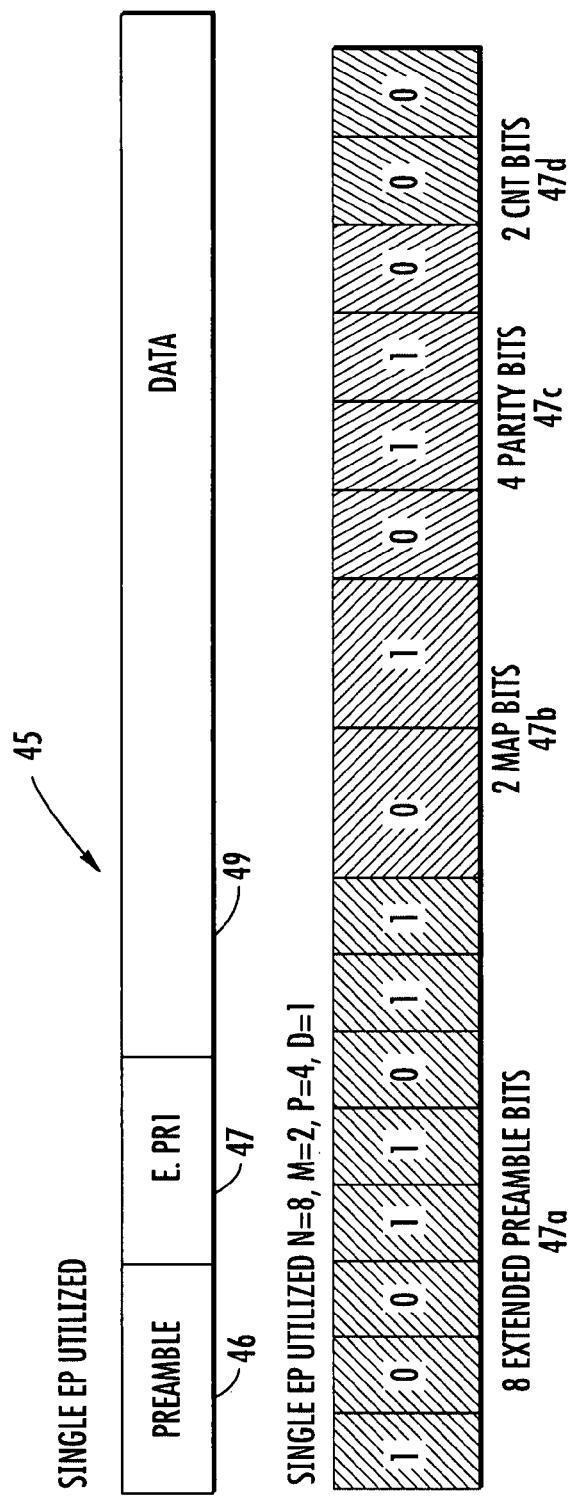
FIG. 5 is another fragmentary block diagram of a communications data packet showing an extended preamble and non-limiting values that can be used for the different sections of the extended preamble.

FIG. 5 is another fragmentary block diagram showing an extended preamble 45 and showing the eight extended preamble bits 47a, two map bits 47b, four parity bits 47c and two control bits 47d. The "00" as the control bits 47d identifies there is only one extended preamble. The "0110" parity bits are used to check the validity of the entire extended preamble 45. The "01" map bits 47b identifies the pre-defined mapping of eight preamble bits to the "XXXXXX" transmit time followed by "YY" number of repeats. The "10011011" in the extended preamble 45 decodes as a transmit time of "100110" repeated "11" times. Before transmission, a rate 4/8 Hadamard code provides a robust but simple decode error correction capability.

The system as described is not a protocol, but can use an existing preamble bit or hypothesis test to determine if an extended preamble is present. In the hypothesis test, an example could be if the MIL standard is not used and thus the 5,7 identifiers are not possible, the system may look for a pattern and decide whether there is an extended preamble as part of a hypothesis. Thus, a determination would be made whether the preamble is present or not. The hypothesis test is not necessary in the MIL standard as described because the extra 5,7 could be used for the extended preamble identifier. In the hypothesis test, the end of the preamble would be looked at to determine where the data portion starts to hypothesize if there is an extended preamble or data. Thus, the system determines if there is a pattern that starts after the preamble to determine if there is an extended preamble or data following.

The count bits as a field 47d allows multiple extended preambles to be concatenated while the map bits as a field 47b allows a system to have several different definitions of the extended preamble bits, while each of the concatenated extended preambles can provide different or the same information. This approach does not use more bandwidth than is necessary and can be used to break a single transmission into subsections.

The system as described is adequate for an enhancement for the MIL-STD-188-110B and 188-141B standards.

For purposes of description, some background information on coding, interleaving, and an exemplary wireless, mobile radio communications system that includes ad-hoc capability and can be modified for use is set forth. This example of a communications system that can be used and modified for use with the present invention is now set forth with regard to FIGS. 6 and 7.

An example of a radio that could be used with such system and method is a Falcon™ III radio manufactured and sold by Harris Corporation of Melbourne, Fla. This type of radio can support multiple wavebands form 30 MHz up to 2 GHz, including L-band SATCOM and MANET. The waveforms can provide secure IP data networking. It should be understood that different radios can be used, including software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

Figure 6:
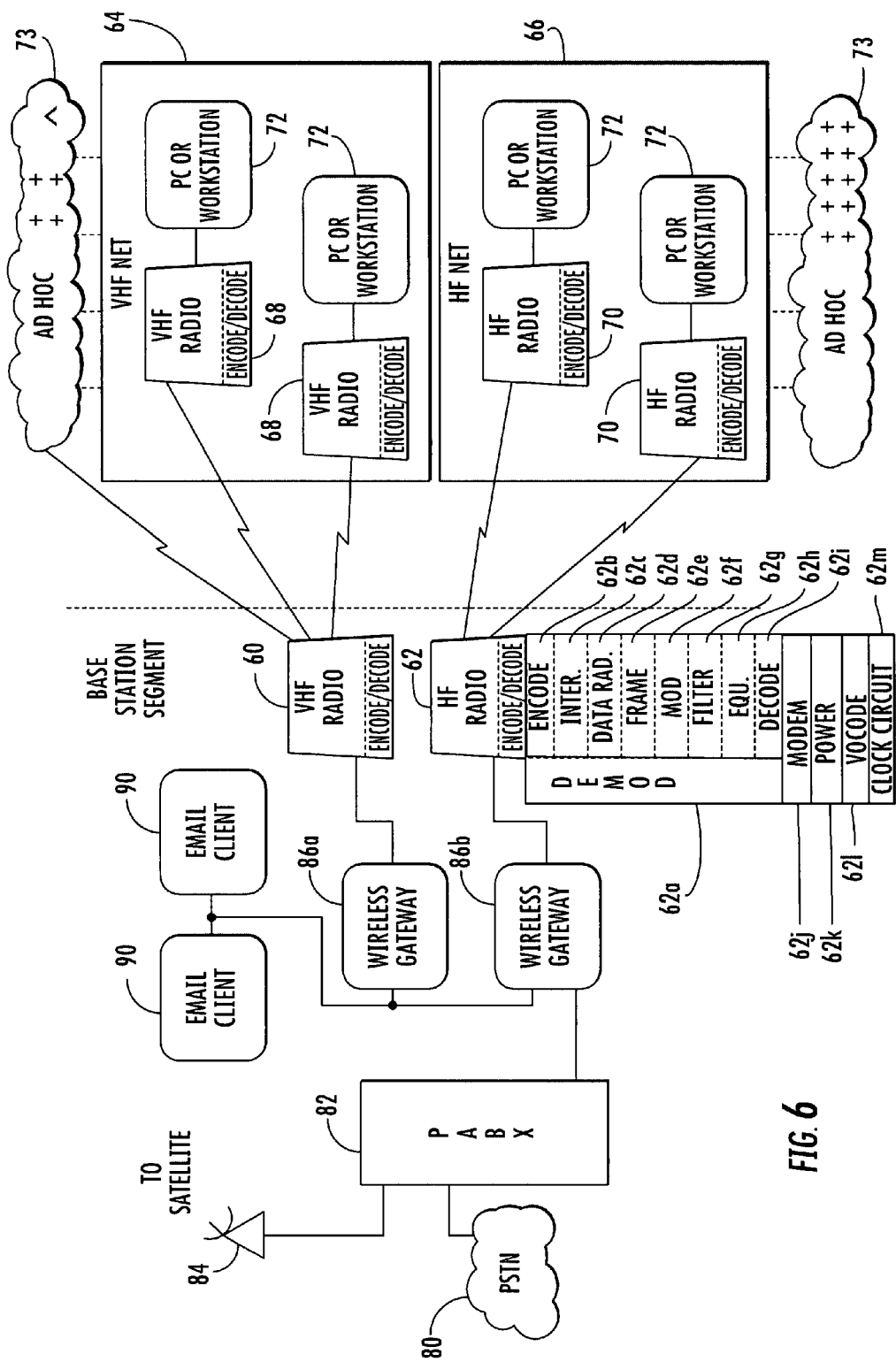
FIG. 6 is a block diagram of an example of a communications system that can be used in accordance with a non-limiting example of the present invention.

For purposes of description only, a brief description of an example of a communications system that includes communications devices that incorporate the filter in accordance with a non-limiting example, is described relative to a non-limiting example shown in FIG. 6. This high-level block diagram of a communications system includes a base station segment and wireless message terminals that could be modified for use with the present invention. The base station segment includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68, 70. Ad-hoc communication networks 73 are interoperative with the various components as illustrated. The entire network can be ad-hoc and include source, destination and neighboring mobile nodes. Thus, it should be understood that the HF or VHF networks include HF and VHF net segments that are infrastructure-less and operative as the ad-hoc communications network. Although UHF and higher frequency radios and net segments are not illustrated, these could be included.

The radio can include a demodulator circuit 62a and appropriate convolutional encoder circuit 62b, block interleaver 62c, data randomizer circuit 62d, data and framing circuit 62e, modulation circuit 62f, matched filter circuit 62g, block or symbol equalizer circuit 62h with an appropriate clamping device, deinterleaver and decoder circuit 62i modem 62j, and power adaptation circuit 62k as non-limiting examples. A vocoder circuit 62l can incorporate the decode and encode functions and a conversion unit could be a combination of the various circuits as described or a separate circuit. A clock circuit 62m can establish the physical clock time and through second order calculations as described below, a virtual clock time. The network can have an overall network clock time. These and other circuits operate to perform any functions necessary for the present invention, as well as other functions suggested by those skilled in the art. Other illustrated radios, including all VHF (or UHF) and higher frequency mobile radios and transmitting and receiving stations can have similar functional circuits. Radios could range from 30 MHz to about 2 GHz as non-limiting examples.

The base station segment includes a landline connection to a public switched telephone network (PSTN) 80, which connects to a PABX 82. A satellite interface 84, such as a satellite ground station, connects to the PABX 82, which connects to processors forming wireless gateways 86a, 86b. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance radio at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Figure 7:
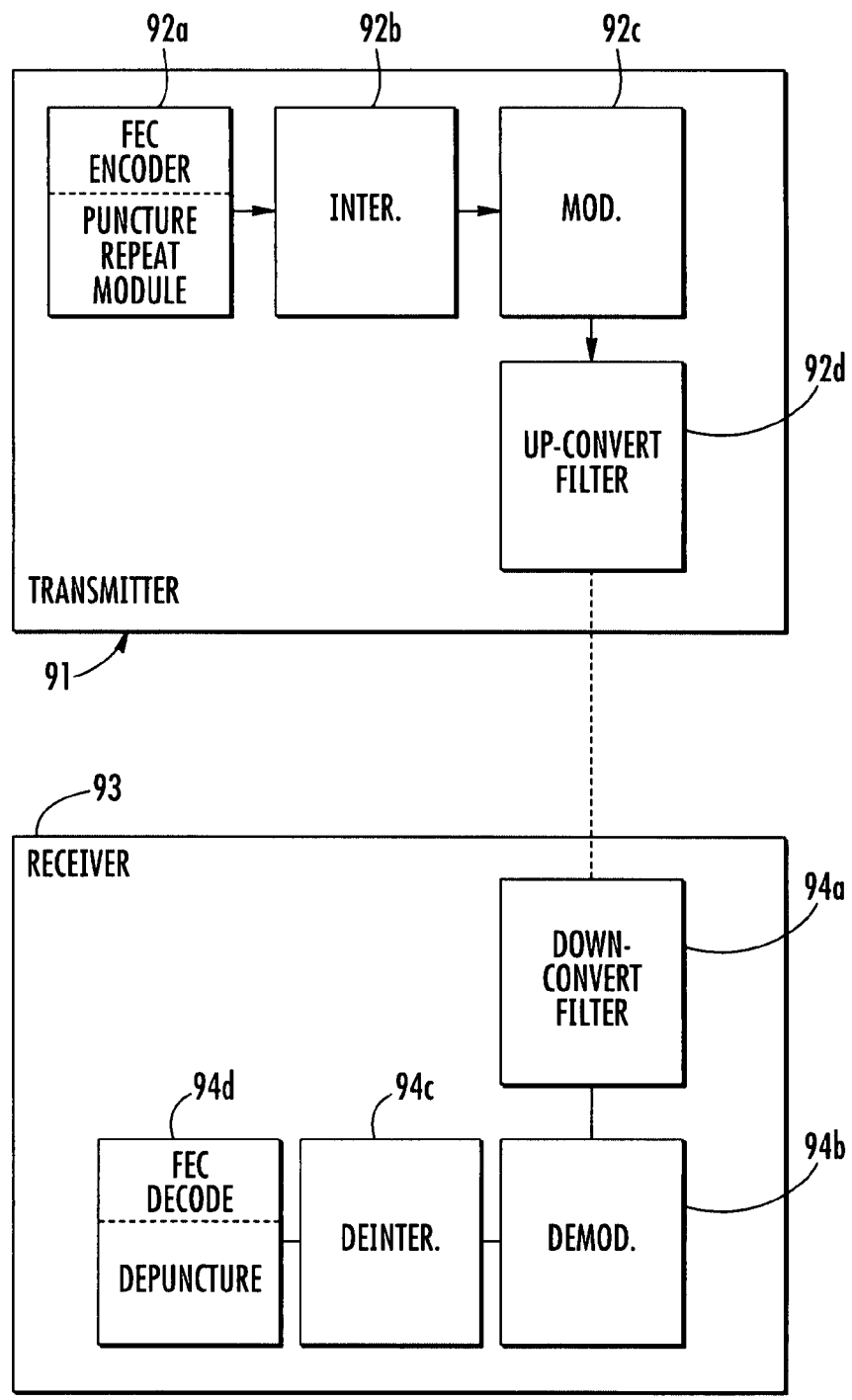
FIG. 7 is a high-level block diagram showing basic components that can be used in accordance with a non-limiting example of the present invention.

A communications system that incorporates communications devices can be used in accordance with non-limiting examples of the present invention and is shown in FIG. 7. A transmitter is shown at 91 and includes basic functional circuit components or modules, including a forward error correction encoder 92a that includes a puncturing module, which could be integral to the encoder or a separate module. The decoder 92a and its puncturing module includes a function for repeating as will be explained below. Encoded data is interleaved at an interleaver 92b, for example, a block interleaver, and in many cases modulated at modulator 92c. This modulator can map the communications data into different symbols based on a specific mapping algorithm to form a communications signal. For example, it could form Minimum Shift Keying or Gaussian Minimum Shift Keying (MSK or GMSK) symbols. Other types of modulation could be used in accordance with non-limiting examples of the present invention. Up-conversion and filtering occurs at an up-converter and filter 92d, which could be formed as an integrated module or separate modules. Communications signals are transmitted, for example, wirelessly to receiver 93.

At the receiver 93, down conversion and filtering occurs at a down converter and filter 94a, which could be integrated or separate modules. The signal is demodulated at demodulator 94b and deinterleaved at deinterleaver 94c. The deinterleaved data (i.e. bit soft decisions) is decoded and depunctured (for punctured codes), combined (for repeated codes) and passed through (for standard codes) at decoder 94d, which could include a separate or integrated depuncturing module. The system, apparatus and method can use different modules and different functions. These components as described could typically be contained within one transceiver.

It should be understood, in one non-limiting aspect of the present invention, a rate 1/2, K=7 convolutional code can be used as an industry standard code for forward error correction (FEC) during encoding. For purposes of understanding, a more detailed description of basic components now follows. A convolutional code is an error-correcting code, and usually has three parameters (n, k, m) with n equal to the number of output bits, k equal to the number of input bits, and m equal to the number of memory registers, in one non-limiting example. The quantity k/n could be called the code rate with this definition and is a measure of the efficiency of the code. K and n parameters can range from 1 to 8, m can range from 2 to 10, and the code rate can range from 1/8 to 7/8 in non-limiting examples. Sometimes convolutional code chips are specified by parameters (n, k, L) with L equal to the constraint length of the code as L=k (m−1). Thus, the constraint length can represent the number of bits in an encoder memory that would affect the generation of n output bits. Sometimes the letters may be switched depending on the definitions used.

The transformation of the encoded data is a function of the information symbols and the constraint length of the code. Single bit input codes can produce punctured codes that give different code rates. For example, when a rate 1/2 code is used, the transmission of a subset of the output bits of the encoder can convert the rate 1/2 code into a rate 2/3 code. Thus, one hardware circuit or module can produce codes of different rates. Punctured codes allow rates to be changed dynamically through software or hardware depending on channel conditions, such as rain or other channel impairing conditions.

An encoder for a convolutional code typically uses a lookup table for encoding, which usually includes an input bit as well as a number of previous input bits (known as the state of the encoder), the table value being the output bit or bits of the encoder. It is possible to view the encoder function as a state diagram, a tree diagram or a trellis diagram.

Decoding systems for convolutional codes can use 1) sequential decoding, or 2) maximum likelihood decoding, also referred to as Viterbi decoding, which typically is more desirable. Sequential decoding allows both forward and backward movement through the trellis. Viterbi decoding as maximum likelihood decoding examines a receive sequence of given length, computes a metric for each path, and makes a decision based on the metric.

Puncturing convolutional codes is a common practice in some systems and is used in accordance with non-limiting examples of the present invention. It should be understood that in some examples a punctured convolutional code is a higher rate code obtained by the periodic elimination of specific code bits from the output of a low rate encoder. Punctured convolutional code performance can be degraded compared with original codes, but typically the coding rate increases.

Some of the basic components that could be used as non-limiting examples of the present invention include a transmitter that incorporates a convolutional encoder, which encodes a sequence of binary input vectors to produce the sequence of binary output vectors and can be defined using a trellis structure. An interleaver, for example, a block interleaver, can permute the bits of the output vectors. The interleaved data would also be modulated at the transmitter (by mapping to transmit symbols) and transmitted. At a receiver, a demodulator demodulates the signal.

A block deinterleaver recovers the bits that were interleaved. A Viterbi decoder could decode the deinterleaved bit soft decisions to produce binary output data.

Often a Viterbi forward error correction module or core is used that would include a convolutional encoder and Viterbi decoder as part of a radio transceiver as described above. For example if the constraint length of the convolutional code is 7, the encoder and Viterbi decoder could support selectable code rates of 1/2, 2/3, 3/4, 4/5, 5/6, 6/7, 7/8 using industry standard puncturing algorithms.

Different design and block systems parameters could include the constraint length as a number of input bits over which the convolutional code is computed, and a convolutional code rate as the ratio of the input to output bits for the convolutional encoder. The puncturing rate could include a ratio of input to output bits for the convolutional encoder using the puncturing process, for example, derived from a rate 1/2 code.

The Viterbi decoder parameters could include the convolutional code rate as a ratio of input to output bits for the convolutional encoder. The puncture rate could be the ratio of input to output bits for the convolutional encoder using a puncturing process and can be derived from a rate 1/2 mother code. The input bits could be the number of processing bits for the decoder. The Viterbi input width could be the width of input data (i.e. soft decisions) to the Viterbi decoder. A metric register length could be the width of registers storing the metrics. A trace back depth could be the length of path required by the Viterbi decoder to compute the most likely decoded bit value. The size of the memory storing the path metrics information for the decoding process could be the memory size. In some instances, a Viterbi decoder could include a First-In/First-Out (FIFO) buffer between depuncture and Viterbi function blocks or modules. The Viterbi output width could be the width of input data to the Viterbi decoder.

The encoder could include a puncturing block circuit or module as noted above. Usually a convolutional encoder may have a constraint length of 7 and take the form of a shift register with a number of elements, for example, 6. One bit can be input for each clock cycle. Thus, the output bits could be defined by a combination of shift register elements using a standard generator code and be concatenated to form an encoded output sequence. There could be a serial or parallel byte data interface at the input. The output width could be programmable depending on the punctured code rate of the application.

A Viterbi decoder in non-limiting examples could divide the input data stream into blocks, and estimate the most likely data sequence. Each decoded data sequence could be output in a burst. The input and calculations can be continuous and require four clock cycles for every two bits of data in one non-limiting example. An input FIFO can be dependent on a depuncture input data rate.

It should also be understood that the present invention is not limited to convolutional codes and similar FEC, but also turbo codes could be used as high-performance error correction codes or low-density parity-check codes that approach the Shannon limit as the theoretical limit of maximum information transfer rate over a noisy channel. Thus, some available bandwidth can be increased without increasing the power of the transmission. Instead of producing binary digits from the signal, the front-end of the decoder could be designed to produce a likelihood measure for each bit.

Figure 8:
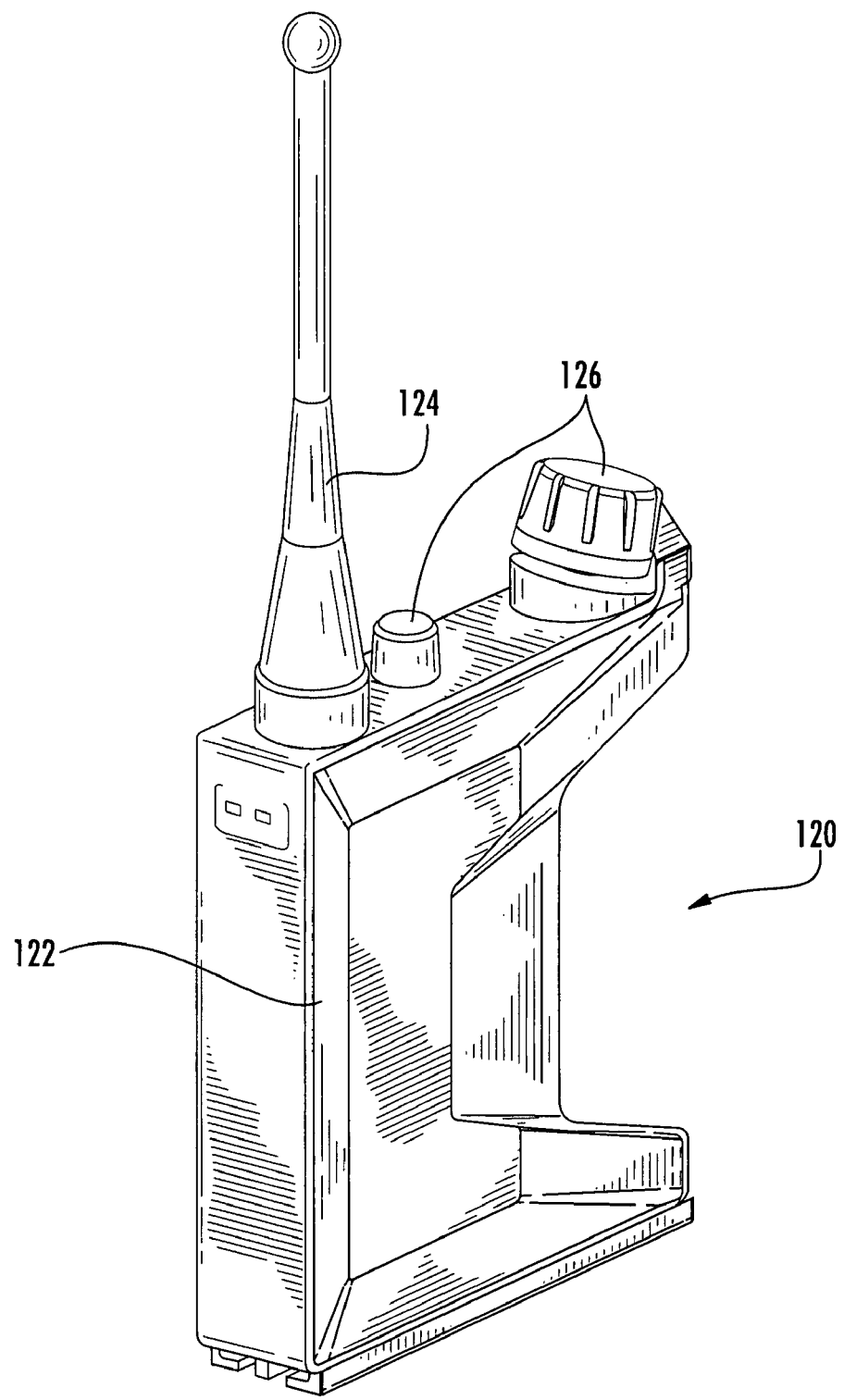
FIG. 8 is a perspective view of a portable wireless communications device as a handheld radio that could incorporate the communications system to transmit a signal having a waveform with an extended preamble in accordance with a non-limiting example of the present invention.

The system and extended preamble, in accordance with non-limiting examples of the present invention, can be used in multiprocessor embedded systems and related methods and also used for any type of radio software communications architecture as used on mainframe computers or small computers, including laptops with an added transceiver, such as used by military and civilian applications, or in a portable wireless communications device 120 as illustrated in FIG. 8. The portable wireless communications device is illustrated as a radio that can include a transceiver as an internal component and handheld housing 122 with an antenna 124 and control knobs. A Liquid Crystal Display (LCD) or similar display can be positioned on the housing in an appropriate location for display. The various internal components, including dual processor systems for red and black subsystems and software that is conforming with SCA, is operative with the illustrated radio. Although a portable or handheld radio is disclosed, the architecture as described can be used with any processor system operative with the transceiver using SCA and the extended preamble in accordance with non-limiting examples of the present invention. An example of a communications device that could incorporate the extended preamble, in accordance with non-limiting examples of the present invention, is the Falcon® III manpack or tactical radio platform manufactured by Harris Corporation of Melbourne, Fla.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for communicating data, which comprises:
an encoder for encoding communications data;
a modulator for mapping the communications data based on a specific mapping algorithm to form a communications signal over which the communications data can be transmitted, said communications signal including a preamble comprising set-up or transmission parameters used for acquiring the signal at a modem and at least one extended preamble for conveying additional set-up or transmission parameters, and comprising N extended preamble bits having at least one of information, transmission parameter and control bits and M map bits that identify a predetermined mapping for the N extended preamble bits.

2. The communications system according to claim 1, wherein said preamble further comprises a modulation parameter field having identifiers for bit rate and interleaver settings wherein said at least one extended preamble is identified by unused identifiers in the modulation parameter field.

3. The communications system according to claim 1, wherein the at least one extended preamble further comprises P parity bits added for error correction to check the validity of the extended preamble.

4. The communications system according to claim 1, wherein the at least one extended preamble further comprises D control bits for indicating the number of extended preambles.

5. The communications system according to claim 4, wherein said control bits sequentially count down to identify the number of extended preambles.

6. The communications system according to claim 5, wherein said control bits sequentially count down to "0" for identifying the last extended preamble.

7. The communications system according to claim 1, and further comprising a block FEC (Forward Error Correction) code added to the extended preamble.

8. The communications system according to claim 1, wherein said N extended preamble bits comprises information identifying where specific data is located within the signal corresponding to a selected type of data.

9. The communications system according to claim 1, wherein said additional set-up or transmission parameters comprise information regarding at least one of a digital voice (DV) mode as a vocoder/bit rate, transmission length, addressing bits, reverse path quality metrics, and information regarding how the data transmission is sectioned.

10. A method of forming a signal, comprising:
encoding communications data within an encoder;
mapping the communications data within a modulator onto modulated symbols based on a specific mapping algorithm to form a communications signal having a preamble that comprises set-up or transmission parameters for acquiring a signal at a modem; and
forming at least one extended preamble within the modulator comprising N extended preamble bits having at least one of information, transmission parameter and control bits and M map bits that identify a predetermined mapping for the N extended preamble bits.

11. The method according to claim 10, which further comprises identifying the at least one extended preamble through unused identifiers that are contained within a modulation parameter field in the preamble.

12. The method according to claim 10, which further comprises checking the validity of the extended preamble by adding P parity bits to the extended preamble.

13. The method according to claim 10, which further comprises indicating the number of extended preambles by adding D control bits.

14. The method according to claim 13, which further comprises sequentially counting down to "0" the control bits for identifying the last extended preamble.

15. The method according to claim 10, which further comprises adding a block FEC (Forward Error Correction) code to the extended preamble.

16. The method according to claim 10, which further comprises identifying where specific data is located within the signal using the N extended preamble bits.

17. The method according to claim 10, which further comprises transmitting within the extended preamble additional set-up or transmission parameters comprising at least one of a digital voice (DV) mode as a vocoder/bit rate, transmission length, addressing bits, reverse path quality metrics, and information regarding how the data transmission is sectioned.

18. A communications system comprising:
an encoder configured to receive and encode communications data with information to be conveyed to a receiver;
a modulator configured to map the communications data and form a communications signal, including a preamble comprising set-up or transmission parameters used for acquiring a signal at a modem and a modulation parameter field having identifiers for bit rate and interleaver settings; and the communications signal further comprising
at least one extended preamble identified by unused identifiers in the modulation parameter field for conveying additional set-up or transmission parameters, and comprising N extended preamble bits having at least one of information, transmission parameter and control bits and M map bits that identify a predetermined mapping for N extended preamble bits.

19. The communications system according to claim 18, wherein the at least one extended preamble further comprises P parity bits added for error correction to check the validity of the extended preamble.

20. The communications system according to claim 18, wherein the at least one extended preamble further comprises D control bits for indicating the number of extended preambles.

21. The communications system according to claim 20, wherein said control bits sequentially count down to identify the number of extended preambles.

22. The communications system according to claim 21, wherein said control bits sequentially count down to "0" for identifying the last extended preamble.

23. The communications system according to claim 18, and further comprising a block FEC (Forward Error Correction) code added to the extended preamble.

24. The communications system according to claim 18, wherein said N extended preamble bits comprises information identifying where specific data is located within the signal corresponding to a selected type of data.

25. The communications system according to claim 18, wherein said additional set-up or transmission parameters comprise information regarding at least one of a digital voice (DV) mode as a vocoder/bit rate, transmission length, addressing bits, reverse path quality metrics, and information regarding how the data transmission is sectioned.

* * * * *